United States Patent
Bouffay et al.

(10) Patent No.: US 9,452,705 B2
(45) Date of Patent: Sep. 27, 2016

(54) LED LAMP PROVIDED WITH A VARIABLE-GEOMETRY BEAM DEVICE

(71) Applicant: Zedel S.A., Crolles (FR)

(72) Inventors: Boris Bouffay, Saint Bernard du Touvet (FR); Alain Maurice, Saint Hilaire du Touvet (FR)

(73) Assignee: Zedel S.A., Crolles (FR)

( * ) Notice: Subject to any disclaimer, the term of this patent is extended or adjusted under 35 U.S.C. 154(b) by 0 days.

(21) Appl. No.: 14/020,126

(22) Filed: Sep. 6, 2013

(65) Prior Publication Data

US 2014/0009066 A1 Jan. 9, 2014

Related U.S. Application Data

(63) Continuation of application No. PCT/EP2012/000984, filed on Mar. 6, 2012.

(30) Foreign Application Priority Data

Mar. 7, 2011 (EP) .................................... 11368004
Dec. 12, 2011 (FR) .................................... 11 03795
Mar. 5, 2012 (FR) .................................... 12 00651

(51) Int. Cl.
| | | |
|---|---|---|
| B60Q 1/02 | (2006.01) | |
| B60Q 1/14 | (2006.01) | |
| H05B 33/08 | (2006.01) | |
| H05B 37/02 | (2006.01) | |
| F21V 23/04 | (2006.01) | |

(Continued)

(52) U.S. Cl.
CPC ............... B60Q 1/1423 (2013.01); F21L 4/00 (2013.01); F21V 14/00 (2013.01); F21V 23/00 (2013.01); F21V 23/0478 (2013.01); F21V 25/00 (2013.01); H05B 33/0818 (2013.01); H05B 33/0854 (2013.01); H05B 37/0227 (2013.01);

(Continued)

(58) Field of Classification Search
USPC ......... 250/200, 201.1, 201.2, 204, 205, 552; 315/76–77, 80, 82
See application file for complete search history.

(56) References Cited

U.S. PATENT DOCUMENTS 6,124,976 A * 9/2000 Miyazaki ............ G02B 27/017
345/7
7,104,455 B2 * 9/2006 Tsikos et al. ............ 235/462.32
(Continued)

FOREIGN PATENT DOCUMENTS

| EP | 2075630 | 7/2009 |
|---|---|---|
| FR | 2930706 | 10/2009 |
| NO | 20024391 | 9/2002 |

OTHER PUBLICATIONS

PCT International Search Report, PCT/EP2012/000984, Mailed: Jan. 14, 2013, Zedel S.A.

(Continued)

*Primary Examiner* — Minh D A
(74) *Attorney, Agent, or Firm* — Saile Ackerman LLC; Stephen B. Ackerman

(57) ABSTRACT

Lamp comprising:
a light source comprising one or more LED type diodes;
control means for controlling the geometry of the light beam of said light source in response to a control information or a control signal;
a control unit for generating said control information or said control signal;
wherein the control unit comprises a image sensor generating at least one image of the area illuminated by said light source and processing means for processing said image so as to generate said control information or said control signal.

15 Claims, 13 Drawing Sheets

(51) Int. Cl.
  *F21V 25/00*   (2006.01)
  *F21V 14/00*   (2006.01)
  *F21V 23/00*   (2015.01)
  *F21L 4/00*   (2006.01)
  *F21Y 101/02*   (2006.01)

(52) U.S. Cl.
  CPC ............ *F21L 4/005* (2013.01); *F21Y 2101/02* (2013.01); *Y02B 20/341* (2013.01); *Y02B 20/44* (2013.01)

(56) References Cited

U.S. PATENT DOCUMENTS

| | | |
|---|---|---|
| 8,378,587 B2 | 2/2013 | Huguenin et al. |
| 8,529,086 B2 | 9/2013 | Skrivan et al. |
| 2002/0015097 A1 | 2/2002 | Martens et al. |
| 2003/0111589 A1* | 6/2003 | Aas et al. ............... 250/208.1 |
| 2004/0201483 A1* | 10/2004 | Stam et al. ............... 340/600 |
| 2005/0061953 A1* | 3/2005 | Huiberts et al. ......... 250/214.1 |
| 2007/0221822 A1* | 9/2007 | Stein et al. ............... 250/205 |
| 2007/0272841 A1* | 11/2007 | Wiklof ................. G01S 7/4817 250/234 |
| 2010/0214791 A1* | 8/2010 | Schofield ............ B60Q 1/1423 362/466 |

OTHER PUBLICATIONS

PCT Written Opinion, PCT/EP2012/000984, Mailed: Jan. 14, 2013, Zedel S.A.

French Search Report 12 00 0651, Nov. 20, 2014.

* cited by examiner

LED LAMP PROVIDED WITH A VARIABLE-GEOMETRY BEAM DEVICE

This application is a Continuation of PCT Application no. PCT/EP2012/000984, which was filed on Mar. 6, 2012.

TECHNICAL FIELD

The present invention relates to lamps fitted with LED diodes, and in particular to a headlamp with LED comprising a device for generating a beam with variable geometry.

BACKGROUND

Headlamps are used in a large number of activities, e.g. professional, sports and leisure.

In general, these lamps are designed to enable efficient and "hand-free" lighting, providing comfortable use with maximum battery life.

Investigations are carried out for several years for the purpose of improving the functionality of the new headlamps.

The Applicant of the present application has invented the so-called concept of "dynamic lighting", consisting in a regulation of the emission of light of the lamp, unlike the "static" mode based on a constant emitting power. The patent application FR2930706 dated Apr. 24, 2008 describes a self-regulated lamp using a sensor for sensing the light reflected by an object illuminated by the lamp so as to allow the control of the brightness of the lamp. FIG. 1 illustrates such a prior art lamp that includes an optical sensor housed in the casing 14 in the vicinity of the light emitting diode LED 11 for generating a signal representative of the light reflected by the surface of an illuminated object 16, and for transmitting said signal to a second input of a control unit 13 to automatically control the power of the LED according to a predetermined threshold. In this way, an automatic regulation of the light beam emitted by the lamp is achieved without requiring any manual action for adapt the light to the environment, while managing energy consumption.

SUMMARY

The present invention aims to significantly increase the functionalities of lamps, in particular by achieving a beam having a variable geometry It is an object of the present invention to provide a headlamp having a beam with variable geometry which allows to take fully advantage of the efficiency of the dynamic lighting, in particularly regarding the increase of the battery life.

It is another object of the present invention to achieve a lamp having a beam with variable geometry which enhances the practicality of the lamp, in particular by adapting the latter to various uses and specific profiles.

It is another object of the present invention to achieve a headlamp fitted with new capabilities which can be used in a wide range of applications.

Those objects are achieved by means of a lamp, such as a headlamp, which comprises:
- a light source having one or more LED-type diodes;
- means for controlling the geometry of the light beam of that light source in response to a control information or a control signal;
- a control unit for generating said control information or said control signal;

The lamp control unit comprises an image sensor generating at least one image of the area illuminated by said light source and means for processing said image in order to generate the control information or the control signal controlling the geometry of the light beam.

In one particular embodiment, the light source comprises one display unit comprising at least two LED diodes, having its own optical systems and which is powered in accordance with the control information or the control signal generated by the image processing.

Alternatively, the light source comprises one or more LED diodes associated to an optical system which can be controlled by means of the control information of the control signal generated by the image processing.

Alternatively, the light source comprises at least a first LED and a second LED having slightly different axis and which respective powering current is dependent on the control information or the control signal generated by the image processing.

In one particular embodiment, the lamp comprises an additional sensor, arranged for detecting part of the light that is reflected by the subject exposed to the light beam, so as to allow a simplified regulation of the power and of the geometry of the beam in accordance with the control information generated by the additional sensor, in combination with the image processing.

Optionally, the lamp may also comprise means for determining the speed, the said image process using both the image process and the said speed determination means so as to control the geometry of the beam.

In one particular embodiment, the processing means determine a Specific Control Area (SCA) within the image, and which is subject of an image processing so as to generate the control information or the control signal controlling the geometry of the light beam.

In one particular embodiment, the processing means comprise an image processor for computing the average brightness of the pixels that are representative of said image for comparison with a threshold in order to generate the control information or the control signal controlling the geometry of the light beam.

In one particular embodiment, the image processor performs an analysis of the contrast of said image for the purpose of detecting fog, mist and/or smoke particles, so as to generate the control information of the control signal controlling the geometry of the light beam.

Preferably, the lamp comprises configuration means for configuration of the lamp, in particular according to one or more predetermined profiles.

The lamp according to the present invention is particularly adapted to the realization of a headlamp which can be used in various applications: climbing, hiking etc. . . .

BRIEF DESCRIPTION OF THE DRAWINGS

Other features, objects and advantages of the invention will become apparent upon reading the following description and drawings below, given by way of non-limiting examples. In the accompanying drawings.

DESCRIPTION

The examples will be now be described are particularly suitable for the production of a lighting lamp fitted with LED power diodes, and in particular a headlamp.

Clearly, these are only non-limiting examples and a skilled man could adapt the teaching of the invention to other lighting devices to increase operational safety.

Figure 1:
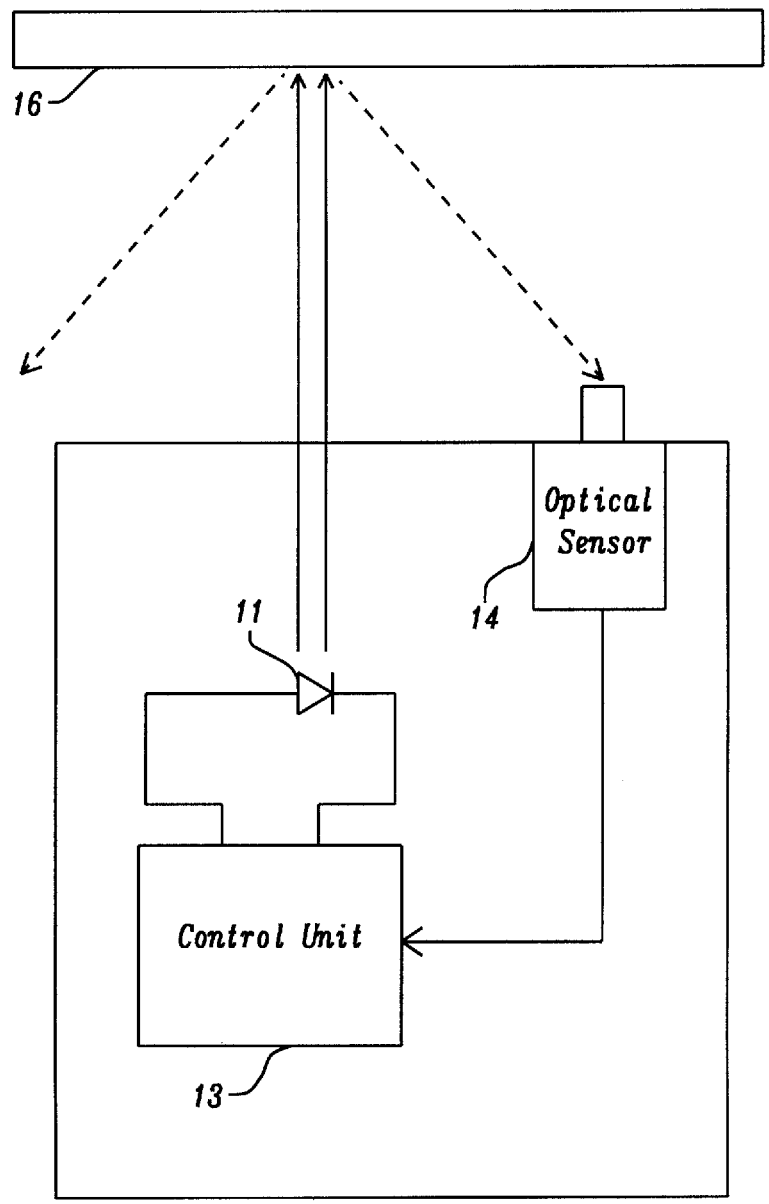
FIG. 1 illustrates a prior art example of a conventional lamp, namely <<dynamic>>, having a regulation of the power consumption.
Figure 2:
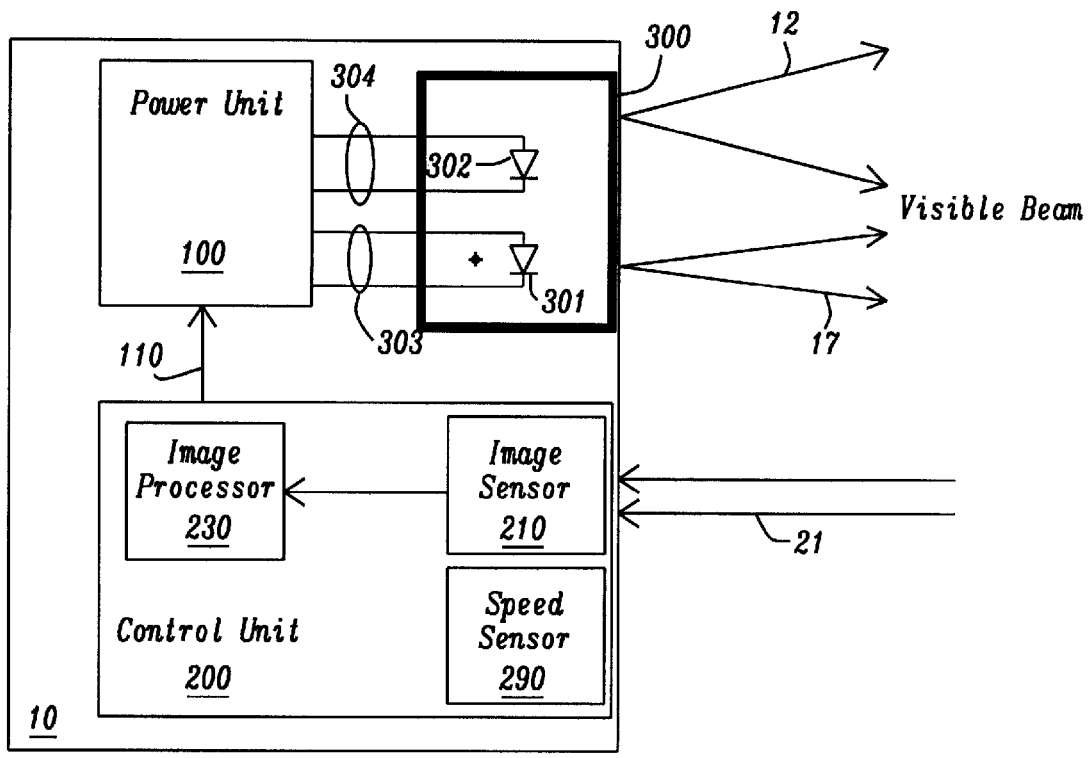
FIG. 2 illustrates a first embodiment of a lamp according to the present invention achieving a beam with variable geometry.

A. A First Embodiment Based on the Combination of LED having their own Focal System FIG. 2 illustrates the general architecture of a first embodiment of an lamp 10—assumed to be a headlamp—with sophisticated means for controlling the light intensity. The lamp 10 includes a power unit 100 combined with a control unit 200 and a lighting unit 300 comprising a plurality of electroluminescent diodes LED 302 fitted with their own focal system.

In the example that is illustrated in FIG. 2, only two diodes 301 and 302 have been represented for the sake of simplicity, respectively having powering leads 303 and 304 which are connected to the power unit. More generally, one can increase the brightness of the lamp by arranging more diodes in a single focal optical system, even by increasing the number of optical systems to increase the usability of the lamp.

In a specific embodiment, the power supply of the LED diodes 301 and 302, respectively, via leads 303 and 304, is performed under the control of control information or control signal 110 generated by the control unit 200.

Power unit 100 specifically includes all the components that are conventionally found in an LED light lamp for producing a light beam having a high intensity, and in general based on the Pulse Width Modulation (PWM), which is well known to the skilled man and which is similar to what is known in the Class D audio circuits. Such PWM modulation is controlled by means of a control signal 110. Generally speaking, one will observe that the term "signal" mentioned above refers to an electrical quantity—current or voltage—used for controlling the power unit, and particularly the PWM modulation used for powering the LED diod 302. This is however only one particular embodiment, and it is possible to replace the "control signal 110" by a "control information", eg logical information that can be stored in a register or in memory and thus transmitted by any appropriate means to control unit 100 to produce the corresponding luminous flux. In one particular embodiment, one may even consider that both control unit and power unit are integrated into a single module or integrated circuit.

One skilled in the art will readily understand, therefore, that when we refer to a "control signal 110", one equally encompasses the embodiments based on an electric control variable—current or voltage—as well as embodiments in which the control is performed by means of a logic information conveyed to the power unit. For this reason, we will discuss below indiscriminately control signal or control information.

In general, the components that make up the power unit 100—switches and circuits—are well known to those skilled in the art and the description will be deliberately reduced in this regard for the sake of conciseness. Similarly, the reader is referred to the general literature on various aspects of the PWM modulation.

A more specific embodiment of the power unit will be described with details in reference to FIG. 5. Returning to FIG. 2, one sees that control unit 200 comprises an image sensor 210 having an axis parallel to that of LED 302, which generates images for image processor 230 able to process such images and, in a particular and optional embodiment, speed determination means such as a speed sensor 290 or even a sensor of the type Global Positioning System (GPS) capable of generating information on the position of the lamp as well as its speed.

In accordance with the embodiment of FIG. 2, the images 21 captured by image sensor 210 and optionally the information representative of the speed sensed by the sensor 290 are used to generate, thanks to the processing performed by image processor 230 within control unit 200, a control information or a control signal 110 to be transmitted to power unit 100 for the purpose of controlling the power supply of the LEDs 301 and 302 and, therefore, controlling the focal distance of the light beam generated by the lamp.

It thus becomes possible, by means of a computer program processing the images captured by sensor 210, to control the geometry of the light beam which is produced by the headlight and in particular the generation of a lighting cone which can be more or less wide in accordance with the specific situation analysed by the image processor.

In some situations, image processor 230 can then automatically determine the control of a wider or narrower light cone, as shown with the beams 17 and 12 of FIG. 2.

Generally speaking, the controls 110 may result from the application of several criteria, either applying independently or even jointly.

In a particular embodiment, the speed information can be used in a simple way for controlling the geometry of the beam—for example to increase the "distant" vision of the holder of the lamp when the sensor detects fast moves, such as when the lamp holder is running or is fast moving. Similarly, the control unit 100 may include an additional sensor—or implement a specific algorithm—to determine that the holder of the lamp is in a situation of "up" or "down" in order to control adequately the geometry of the light beam in the position of "descent" of a slope to increase visibility and safety.

Alternatively, the specific control of the focal distance associated to the light beam can result from the detection of an increase of the light generated by the LED, such detection itself resulting from a control signal 110 deriving from a processing of an image captured by sensor 210, and which corresponds to a situation requiring the selection of an adequate LED with its associated optical system.

B. A Second Embodiment Based on a Controllable Optical System

It will now be described with reference to FIG. 3, a second embodiment in which block 300 having multiple focal optics has been replaced by a new lighting unit 305 includes a set of LED diodes associated with a common optical system 306, that is controlled by a control signal 111 for the purpose of controlling the geometry of the illumination light beam.

The elements apparent in FIG. 2 which remain unchanged with respect to the first embodiment retain their reference number.

One may observe, in this second embodiment, that the control unit now generates two control information: a first information conveyed by the signal 110 to the power unit 100 for controlling the supply current of the diode 302 (via the power supply wires 304) and a second information conveyed by the signal 111 for the controllable optical system 306 for controlling the geometry of the beam, such as for example the zoom effect being associated to it. In order to realize module 306, one may consider any type of system having controllable optics, in particular by using the more recent developments in microelectrics, such as MEMS (Micro Electrical Mechanical Systems) micromirrors.

Thanks to an image processing, similar to the one used in the first embodiment, control signals 110 and 111 can be controlled so as to generate a light beam 18 having the desired brightness and geometry characteristics.

Clearly, a "zoom" effect being automatically controlled by the control signal 111 can be achieved in this way, but more generally any geometrical effect on the light beam.

The lamp fitted with such a device becomes particularly functional, as this will be seen below with the described examples of image processing.

However, the possibilities of control of the geometry of the light beam are certainly not exhausted with this second embodiment, and one will see now.

C. Description of a Third Embodiment Achieving Control of the LED Having Different Beams It will now be described with reference to FIG. 4, a third embodiment wherein unit 300 of the first embodiment is substituted by a set of two series diodes or LEDs diodes having axes being slightly different. As it can be seen in the figure, a first set of diodes (only one diode LED 401 is shown) generates a first beam along axis 15, while a second set of diodes (only one LED 403 being shown) generates a second beam along axis 22. The two sets of diodes 401-403 are supplied through the power unit 100, respectively, via supply wires 402 and 404, also controlled by control unit 100.

Figure 4:
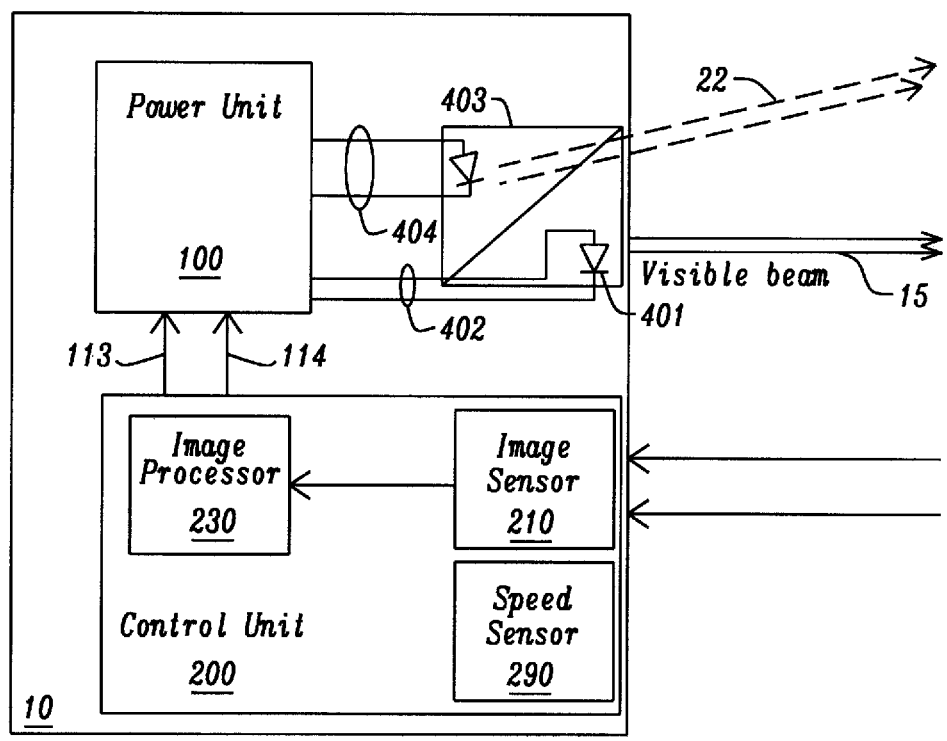
FIG. 4 illustrates a third embodiment of a lamp having a beam with variable geometry.

If FIG. 4 illustrates an embodiment with only two series of diodes and hence two separate axes 15 and 22, it is clear that a man skilled in the art can adapt the invention so as to produce a greater number of light beams.

In the embodiment of FIG. 4, one can observe that the control unit 200 generates two control information or control signals, respectively 113 and 114, which are intended to be controlling the power emitted by their corresponding LEDS, namely LED 401 and 403.

Again, as in the first two embodiments described above, it is an image processing that is performed by image processor 230, optionally together with the speed information determined by the sensor 290, which generates the control information or control signals 113 and 114.

Figure 5:
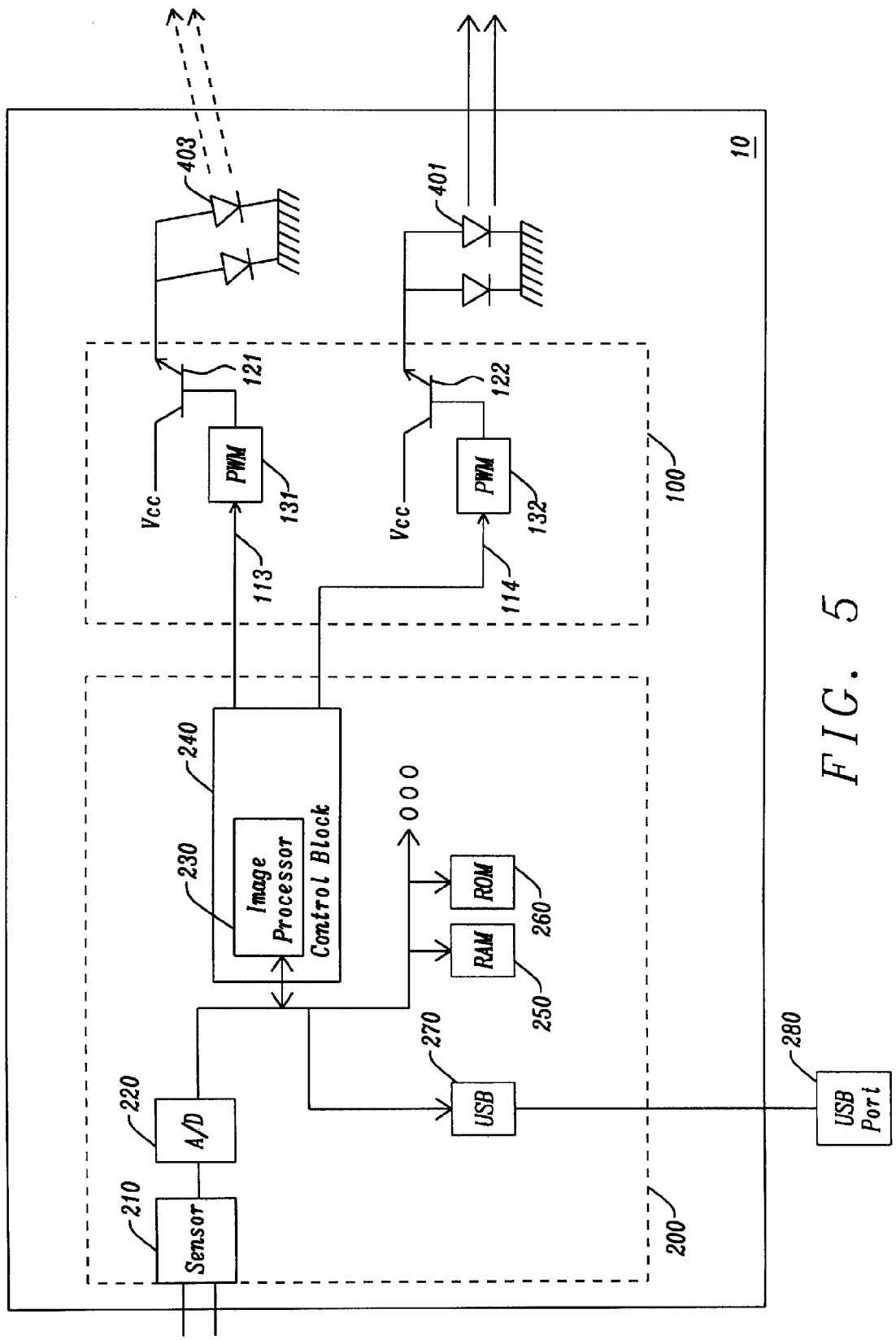
FIG. 5 illustrates the general architecture of the third embodiment shown in FIG. 3.

For the sake of illustration, the embodiment of FIG. 4 is more detailed in FIG. 5, where on can seen that power unit 100 comprises a battery (not shown in the figure), which generates a supply voltage Vcc, and two power switches, respectively 121 and 122, for powering with current LED diodes 403 and 401, respectively, and respectively controlled by circuits 131 and 132, applying PWM modulation. Switches 121 and 122 are for instance of the type semiconductuor, such as FET (Field Effect Transistor) or MOSFET (Metal Oxide Semiconductor) or MOSFET.

The two circuits 121 and 122 are respectively controlled by the control information of control signals 113 and 114 which are generated by control block 240 integrated within control unit 200. This is only one embodiment and, clearly, one man skilled in the art can use other examples of architectures, and in particular by integrating the two circuits 121 and 122 within a same electronic circuit.

Still referring to FIG. 4, the control unit 240 includes an image processor 230 which communications via conventional address, data and control but with RAM memory 250, ROM or EEPROM memory 260 etc. . . .

For the sake of illustration, the image capture sensor 210 which is represented in FIG. 2 is an analog sensor, such as for example a video camera or an analog module provided with its optical system, and associated to an analog-to-digital converter 220 for converting into digital information the analog signals generated by image capture sensor 210, which digital information can then be made available to image processor 230 via the data, address buses etc. . . .

In one particular embodiment, a fully digital structure is being considered and the units 210-220 will be replaced by a digital sensor, such as a CCD (Charge Coupled Device) sensor well known in the field of digital photography. A digital image, arranged in pixels—e.g. with a size 640×480 pixels—will then be directly available. Each pixel I (x, y) will be assigned a value representative of the brightness of the image or its color components.

One may also consider to embody within a single integrated circuit the two functions of images capture and image processing so as to achieve adequate miniaturization of the realization.

In a preferred embodiment, the image capture sensor 210 has an axis which is substantially parallel to the axis of the LEDs so that the image sensed by capture sensor 210, coincides with the area illuminated by the latter.

In another embodiment, a USB port 280 is accessible via a USB module 270 which is included in the control unit and connected to the bus, allowing the exchange of data according to the USB standard. Specifically, the USB interface will allow, as this will be seen below, the storage of settings parameters and profiles within the lamp.

In this way, the control unit can communicate with a data processing device such as a computer, a laptop, a touch pad, a personal assistant and even a smartphone It should be noted that the USB port is only one illustrative example of a means for achieving communication between the lamp and a computer, and a skilled person may consider any other communication means, including wireless communication means (Bluetooth, wifi etc . . . ). In one particular embodiment, the headlamp will be arranged with its own IP (Internet Protocol) address so as to allow easy configuration, for instance through a dedicated web server.

Such communication is particularly advantageous, for instance for exchanging configuration data and settings, such as "profiles" that can serve for storing and selecting, as necessary, the settings of the lamp in accordance with the desired use wished by its owner, and especially settings for implementing the illustrative functional diagrams which will be described below. Alternatively or additionally, the "profiles" can be used, as described below, for executing specific procedures or modes, such as the so-called static mode (wherein the regulation process is disactivated) and the dynamic mode (wherein the regulation process is fully operational).

One will now more specifically describe the operation of the architecture described above which achieves particularly useful regulation of the transmission power of the LED and the control of the swivel of the light beam.

Indeed, thanks to the capturing and the processing of the images by image sensor, the light bean can be controlled based on that image processing. More specifically, one can combine the image processing with any information representative of the speed so as to make more accurate the control of the beam.

Figure 6:
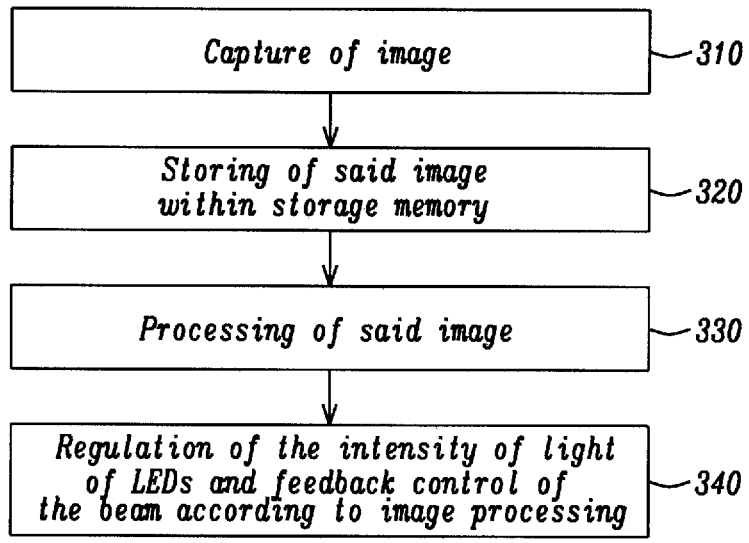
FIG. 6 illustrates a first embodiment of a process for controlling the light beam on the basis of the entire image captured by the image sensor.

One embodiment of a process is more specifically illustrated in FIG. 6, which process starts with a step 310 in which an image is subject to capture or a sensing by means of image capture sensor 210.

Then, in a step 320, the image is transferred via the data and address busses of the control unit 100 and the process performs the storage of said image within a memory such as RAM memory 250 illustrated in FIG. 2.

Then, in a step 330, the process performs a logical processing of the image stored by means of image processor 230. In one embodiment, each image is separately processed so as to generate a control information (or control signal) 110 for the power unit 100, as well as a control signal 111 for the display unit 300 (resp. 305) of the embodiment of FIG. 2 (resp. 3) or for the respective control of diodes 401 and 403 in the embodiment of FIGS. 4 and 5. Alternatively, the image processor performs collective or batch processing of a series of multiple images stored within the memory so as to periodically generate a control information (or control signal) for power unit 100 and for rotating optical block 300 for achieving feedback control of the light power and of the light beam geometry.

In general, one may consider various logical and digital processing of the captured images.

In particular, one man skilled in the art may decide to perform a sequential processing of the different individual pixels composing each image as well as the different color, brightness, contrats components . . . . One may further consider the process of the entire image or only one particular area (which will hereinafter be designated as a Specific Control Area (SCA)). In addition, the process may also involve the processing of a succession of images so as to achieve a time integration of the various components of the image and thus derive therefrom a statistical information that can be used for controlling the light intensity of LED lamps as well as the light beam geometry Even more sophisticated, one may also encompass, in the logic and/or digital processing of the image, some algorithms achieving shape and/or objects recognition which can be useful for generating a control information or a control signal to be forwarded to power unit 100, as this will be described more particularly below.

Figure 3:
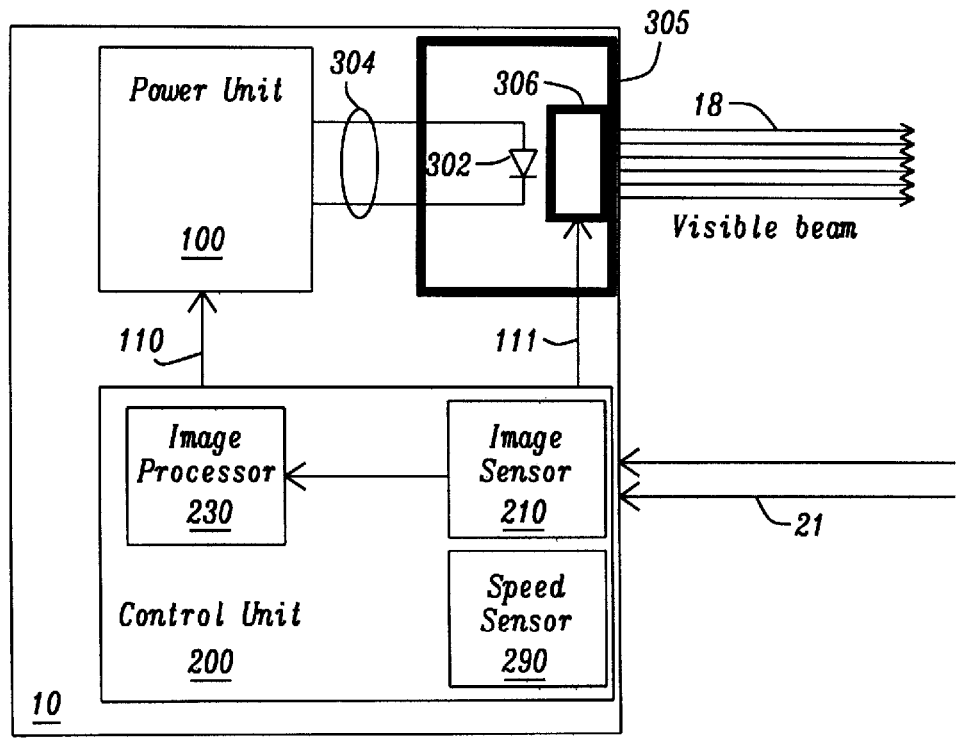
FIG. 3 illustrates a second embodiment of a lamp achieving a beam with variable geometry.

Upon completion of this image processing being performed in step 330, the process then proceeds to a step 340, which is the generation and transmission of the control information (or control signal)—ie signals 110-111 of FIG. 3 and 113-114 of FIGS. 4 and 5—to control power unit 200, which can then produce a luminous flux perfectly controlled and regulated with a controlled beam geometry according to the result of the digital processing performed by the image processor 230.

Figure 7:
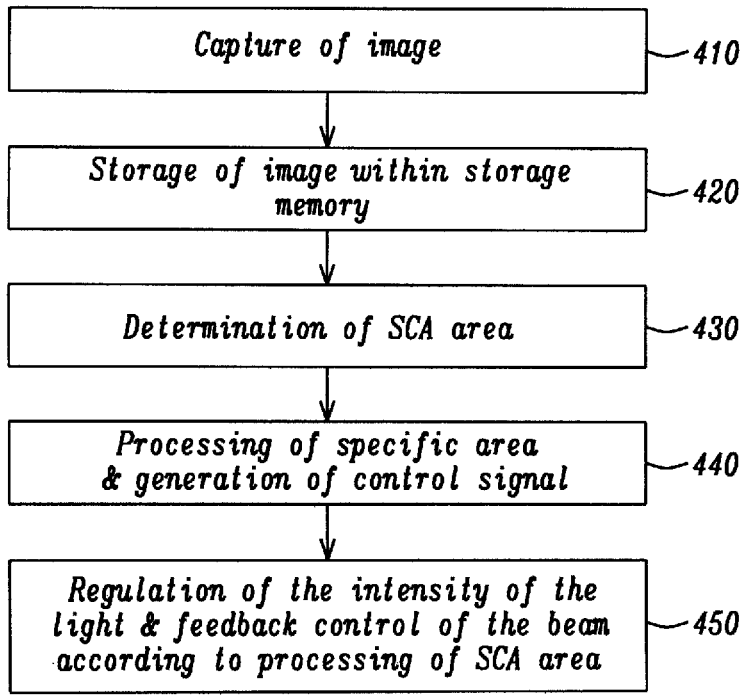
FIG. 7 illustrates a second embodiment of a process for controlling the light beam implementing a specific control area (SCA).

FIG. 7 illustrates a second embodiment of a process for controlling and/or regulating the light intensity of the LEDs, wherein the image processor only processes a portion of the image, hereinafter designated under the name Specific Control Area (SCA).

The process starts with a step 410 where the image capture sensor-210 captures an image.

Then, in a step 420, the process proceeds with the storing of said image within a memory such as RAM memory 250.

Then, in a step 430, the process proceeds with the determination of a Specific Control Area (SCA) of the image thanks to the image processor 230.

Then, in a step 440, the process proceeds with the processing said SCA area by means of the image processor 230, so as to generate an control information or control signals 110-111 (in FIG. 3) or 113-114 (in FIGS. 4 and 5).

Then, in a step 450, the process proceeds with the transmission of the control information or control signal to the power unit 100 and, in the case of the embodiment of FIG. 3, to display unit 300 and more specifically the controllable optical system 306—so as to achieve the control of the luminous intensity of the LEDs 401-403 in accordance with the result of processing performed in step 440. One thus achieves, in this manner, to control the geometry of the light beam as well as the light intensity of the LEDs in accordance with part only of the information received by the image capture device corresponding to the SCA defined in step 430.

One thus sees how flexible is the process which allows various possibilities of feedback control and regulation of the power of the lamp.

One will now more specifically describe embodiments of the process achieving the computation of the power of emission of the lamp, and it is to be understood that the result of such processes will be useful, at mentioned above, as criteria for controlling the rotation towards the up of the light beam.

Figure 8:
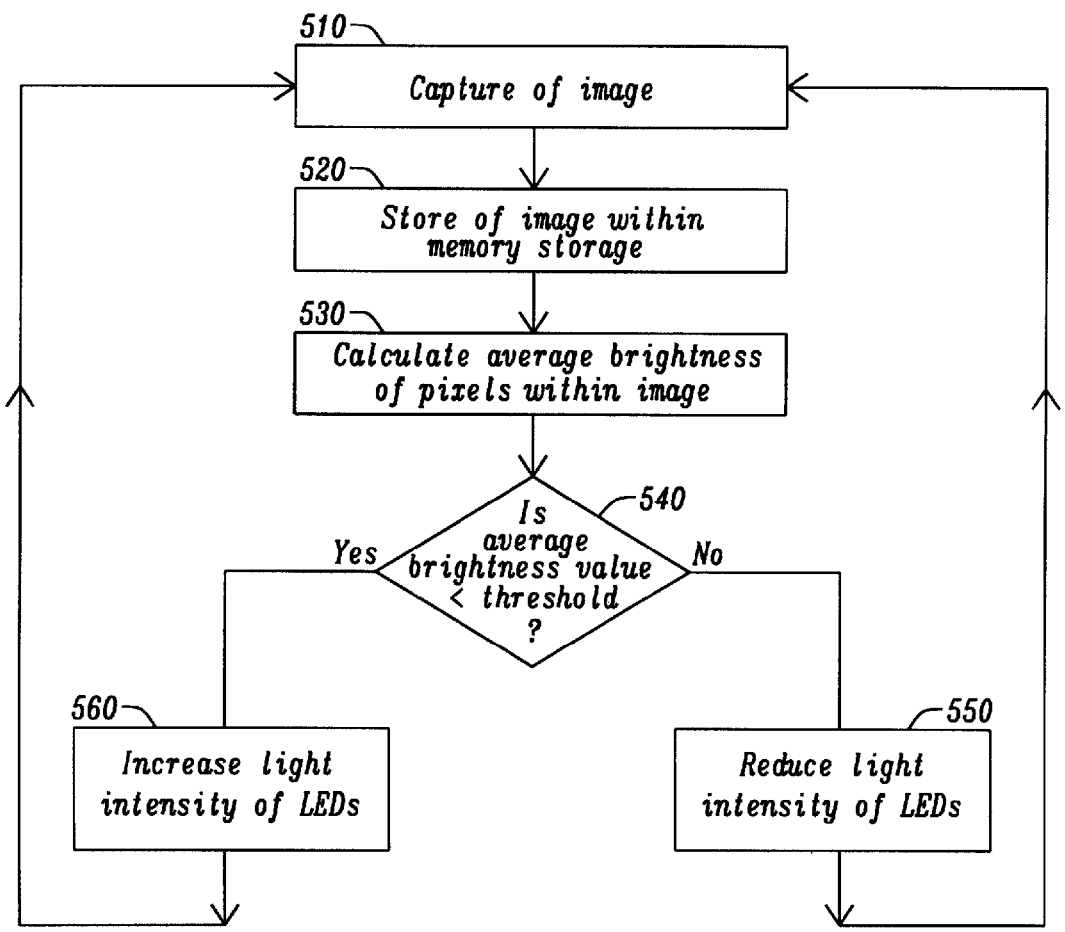
FIGS. 8 and 9 illustrate two embodiments of a process based on the calculation of the brightness of the image processed by the image processor.
Figure 9:
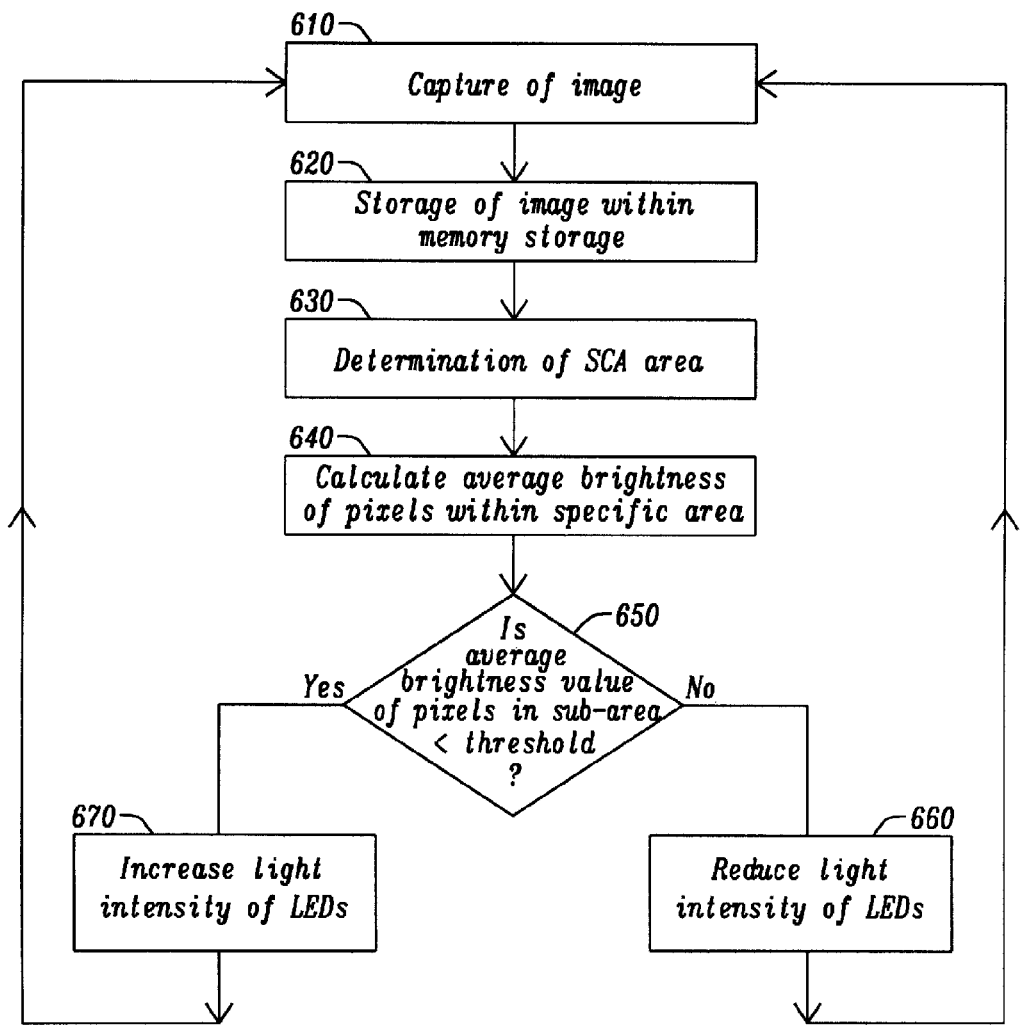
Figure 10:
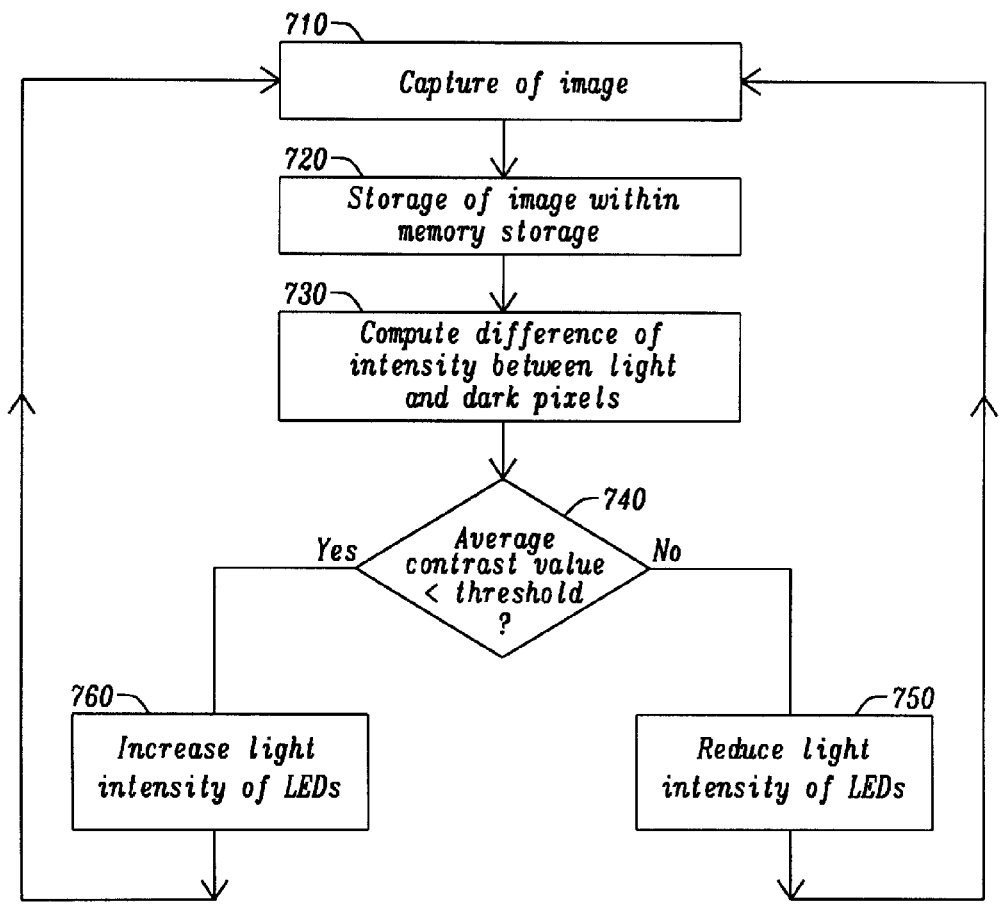
FIGS. 10 and 11 illustrate two embodiments of a process based on the calculation of the contrast of the image processed by the image processor.
Figure 11:
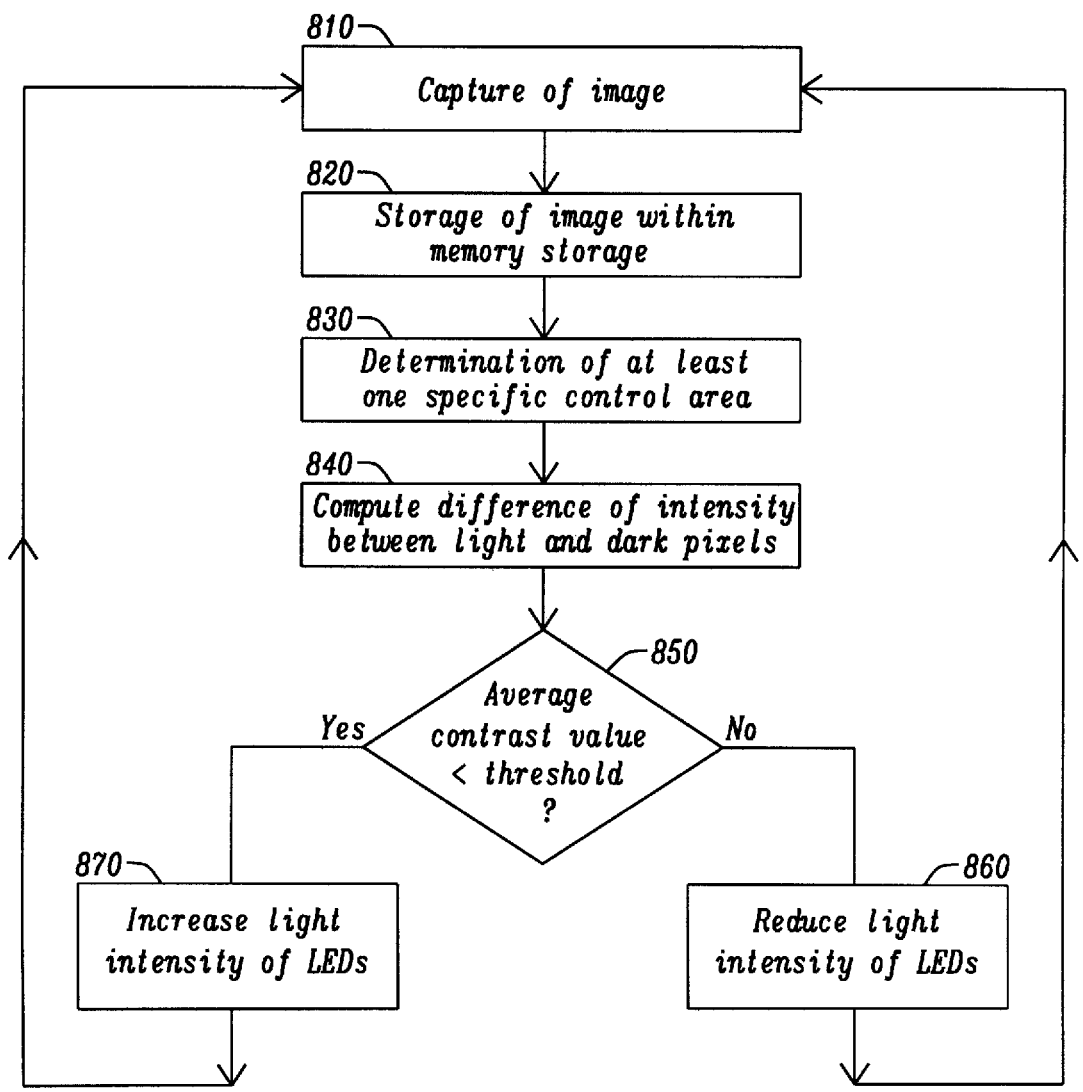

FIGS. 8-9 illustrate more particularly examples of the processing of the brightness whereas FIGS. 10-11 more specifically address an analysis of the contrast.

The process of FIG. 8 starts with a step 510 where the image capture sensor 210 captures an image.

Then, in a step 520, the process continues with the storage of said image within the storage memory.

Then, in a step 530, the process proceeds with the calculation of the average brightness of the pixels of said image by means of the image processor 230.

Then, in a step 540, a test is performed by the image processor 230, namely a comparison between the value of the average brightness of the pixels of said image and a predetermined threshold value stored within RAM memory 240. In one embodiment, the predetermined threshold is selected to match the sensitivity of the human eye in order to make regulation as natural as possible for the average user control.

When the average brightness value exceeds the predetermined threshold, the process continues with a step 550, where a control information (or a control signal) is generated and transmitted to the power unit so as to reduce the amount of light generated by the LEDs. Optionally such control can be combined with a control of the geometry of the light beam.

The process then returns to step 510 where the image sensor 210 captures a new image.

In contrast, where, during the test of step 540, the value of the average brightness of the pixels of said image is less than the predetermined threshold, the process continues with a step 560 during which said control unit 240 generates a control information or a control signal for increasing the light generated by the LED. Optionally such control can be combined with a control of the geometry of the light beam.

The process then returns to step 510 where the image sensor 210 captures a new image.

FIG. 9 illustrates one embodiment of a method for controlling the light intensity of the lamp with a more particular implementation of a more specific implementation of a Specific Control Area (SCA).

The process starts with a step 610 where the image sensor 210 captures an image.

Then, in a step 620, the process continues with the storing of said image within a memory storage, such as RAM storage 250 and ROM 260 shown in FIG. 2.

Then, in a step 630, the process proceeds to the determination of a specific control area (SCA) of the image by means of image processor 230.

Then, in a step 640, the process proceeds with the calculation of the average brightness of the pixels of said SCA area of said image, by means of said image processor 230.

Then, in a step 650, a test is performed by the image processor 230, namely a comparison between the value of the average brightness of the pixels of said SCA area of said image and a predetermined threshold value stored in the memory.

Then, in a step 660, the process proceeds with the generation by said control block 240 of a control information or control signal for reducing the amount of light generated by the LEDs when the average brightness value of the SCA pixels exceeds the predetermined threshold. Optionally such control can be combined with a control of the geometry of the light beam.

The process then returns to step 610 where the image sensor 210 captures a new image.

If, during the test of step 640, the average brightness value of the pixels of said SCA area is below the predetermined threshold, the process then continues with a step 670 wherein a control information or a control signal is generated so as to increase the amount of light generated by the LEDs. Optionally such control can be combined with a control of the geometry of the light beam.

The process then returns to step 610 for capturing a new image.

The image processor 230 therefore performs an appropriate image processing in order to derive control information or a control signal determining both the power emission of the LED and the geometry of the light beam. In practice, brightness variations can follow either a continuous or a discrete profile. In the simplest implementation, one can consider a simplified modulation of the emission power on the basis of a number of levels for the purpose of carrying out a gradual progression of the nominal emitting power: 100%, 80%, 60% etc. . . . In more sophisticated embodiments, one may consider a real feedback linear control of the emitting power achieving a continuous variation in accordance with the average brightness derived from the image processing.

Beyond the processing of the sole brightness, the process may further involve the processing of the contrast as that illustrated with reference to FIG. 10, which process starts with a step 710 where the image sensor 210 captures an image.

Then, in a step 720, the process proceeds with the storing of said image within the storage memory.

Then, in a step 730, the process proceeds with the computation of the difference in intensity between light and dark pixels by means of the image processor 230, so as to generate an information that is representative of the image contrast, for example the average value of the contrast of the entire captured image.

Then, in a step 740, a test is performed by the image processor, namely a comparison between the average contrast value and a predetermined threshold value stored within the memory.

When the average contrast value exceeds the predetermined threshold, the process proceeds to a step 750, where a control information or a control signal is generated and forwarded to the power unit 100 so as to reduce the light intensity generated by the LEDs. Optionally such control can be combined with a control of the geometry of the light beam.

The process then returns to step 710 to capture a new image.

If, during the test of step 740, the average value of the contrast is inferior than the predetermined threshold, the process proceeds to a step 760 where said control block 240 generates a control information or a control signal for increasing the light intensity generated by the LED. Optionally such control can be combined with a control of the geometry of the light beam.

The process then returns to step 710 for the purpose of capturing a new image.

As it can be seen with the embodiment of FIG. 8, a contrast processing can also be advantageous to generate useful information for regulating the lamp power. Such processing can include the determination of the presence of fog, mist, etc . . . , many situations where it may be appropriate to increase the brightness of the lamp and also to modify the geometry of the light beam, for instance for raising the axis of the beam of such lamp. Generally, this contrast processing can usefully complement other treatments which are described in this patent application.

FIG. 10 illustrates more particularly one embodiment wherein the calculation of the contrast is performed only on a Specific Control Area (SCA) of the image, which process starts with a step 810 for capturing the image by sensor 210.

Then, in a step 820, the process continues with the storage within storage memory of said image.

Then, in a step 830, the process proceeds with the determination of the SCA area by means of the image processor 230.

Then, in a step 840, the process proceeds to the calculation of the average difference of the intensity between the light and dark pixels within the SCA area, so as to generate an information which is representative of the contrast, for instance the average value thereof.

Then, in a step 850, a test is performed for comparing the average contrast value within the specific area with a predetermined threshold.

When the average contrast value within the specific area exceeds the predetermined threshold, the process generates, in a step 860, a control information or a control signal to reduce the amount of light generated by the LEDs. Optionally such control can be combined with a control of the geometry of the light beam.

The method then returns to step 810 to capture a new image.

On the contrary, if, at the test of step 840, the average contrast value in the SCA area is less than the predetermined threshold, the process continues with a step 870 to generate a control information or a control signal for increasing the light generated by the LED. Optionally such control can be combined with a control of the geometry of the light beam.

The method then returns to step 810 for the purpose of capturing a new image.

The examples which are illustrated in FIGS. 8-9 and 10-11 show how effective and flexible can be the regulation of the emitting power of the lamp and the control process of the geometry of the light beam, which control can be adapted to various situations for the purpose of increasing the accuracy of the feedback control and/or the number of functionalities of the lamp.

In one particular embodiment, the specific area SCA—which is particularly computed in steps 630 and 830 of FIGS. 8 and 10—is determined by means of complementary algorithms implemented for the purpose of detecting distinct objects or artefacts or specific areas within the image.

In one particular embodiment, a specific algorithm implemented in the context of climbing or caving is used for identifying' a band of approximately vertical over-exposure, corresponding to the imprint on the CCD sensor of the image of a rope. The process then leads, in steps 630 and 830 described above, except for the pixels of the SCA area which correspond to the over-exposed imprint of the rope and thus avoid the disturb the regulation process. Optionally such control can be combined with a rotation of the light beam so as to lower it.

In another particular embodiment, the steps 630 and 830 implement another specific algorithm that identifies the periodic passage of hands in front of the image sensor, for example when the user of the lamp climbs a rope. In such a context of climbing activity, the image processing performed by the image processor 230 identifies the image of hands periodically passing in front of the sensor and excludes from the SCA area the pixels corresponding to the hands so as to minimize the interference with the regulation process of the lamp. Optionally such control can be combined with a control of the geometry of the light beam, for instance a rotation of the light beam so as to lower the beam axis.

Climbing and/or caving situations are, however, not the only ones which are likely to take advantage of the significant possibilities allowed by the image processing. Indeed, in another embodiment which may be a more conventional "jogging" or "hiking" situation, the image processor implements an algorithm for the purpose of recognition of specific objects, such as car headlights or any other external source so, once again, to exclude from SCA area the pixels corresponding to these objects.

In another embodiment, the steps 630 and 830 implement another specific algorithm for the purpose of identifying artefacts within the image, of the type "snow" so as to exclude the corresponding pixels of the SCA area, due to their over-exposure to the light flux which might interfere with the regulation process of the lamp. In one embodiment, upon recognition of snow, the process proceeds to the deactivation of the regulation system and thus switches to a static mode.

As it can be seen, a lamp having an imaging sensor can offer multiple possibilities, and a man skilled in the art will be able to adapt the teaching of the present invention to various practical and concrete situations.

Generally speaking, in order to make more user-friendly the use of a image sensor, the objects recognition algorithms and more generally image processing algorithms performed by processor 230 are executed only when activating a configuration corresponding to various predetermined profiles, including by way of illustration a profile "climbing/caving" that the user can activate or not before using the lamp.

Specifically, the activation profile "caving" can be made via the USB port 280 or any equivalent communication means.

Figure 12:
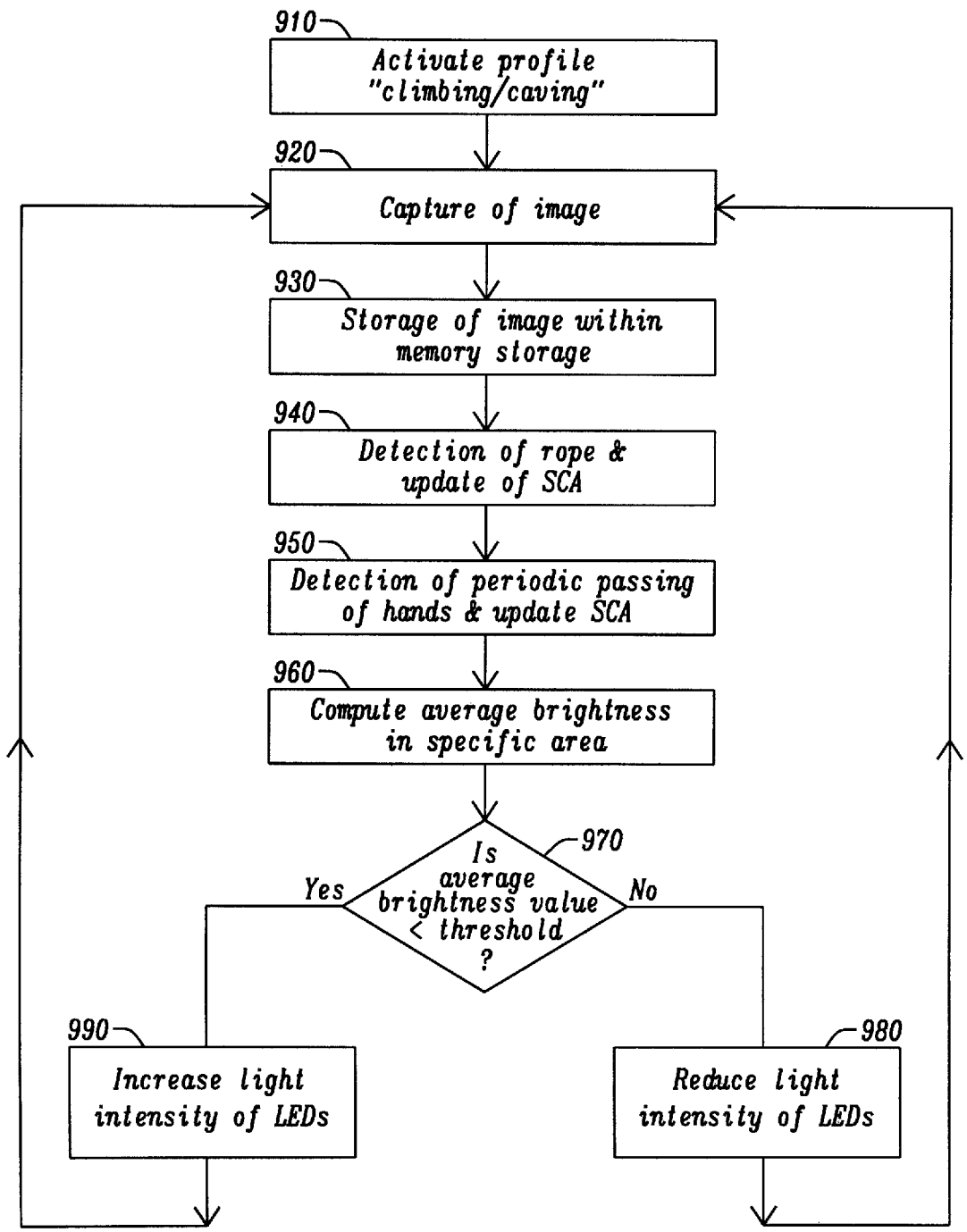
FIGS. 12 and 13 respectively illustrate such a process for controlling the lap, which can be used for two distinct profiles.

FIG. 12 illustrates more specifically that process for controlling the lamp, which can be used in a first profile, said climbing or caving.

In a step 910, the process starts with the activation of the corresponding profile, particularly through the configuration of the lamp via an external terminal (portable computer, smart phone, etc. . . . ).

Then, in a step 920 the process continues with the capture of an image by means of image sensor 210.

Then, in a step 930, the process proceeds with the storage of said image within the storage memory.

Then, in a step 940, the process continues with the execution of a rope recognition algorithm allowing the identification, within the pixelized image, of a vertical strip of approximately well over-exposed pixels. Once identified, the pixels representative of this band are then excluded from the specific control area (SCA), which is then updated.

Then, in a step 950, the process proceeds with the execution of an algorithm performing a batch processing on successive images so as to determine the period passage of hands in front of the sensor 210. Once identified, the corresponding pixels are also excluded from the SCA area.

Once the SCA area is defined, the process proceeds with the calculation, in a step 960, of the average brightness value within the SCA area.

Then, in a step 970, a test is performed by the image processor so as to compare the average brightness value with a predetermined threshold (determined by the activation of specific profile).

When the average brightness value exceeds the predetermined threshold, the process then proceeds to a step 980, where a control information or a control signal is generated and forwarded to the power unit so as to reduce the amount of light generated by the LEDs. Optionally such control can be combined with a control of the geometry of the light beam, for instance a rotation of the light beam.

The process then returns to step 920 for the purpose of capturing a new image.

If, during the test of step 970, the average contrast value is below the predetermined threshold, the process then proceeds to a step 990 where control block 240 generates a control information or a control signal for increasing the light intensity generated by the LED. Optionally such control can be combined with a control of the geometry of the light beam.

The process then returns to step 920 for the purpose of capturing a new image.

Fissure 13 illustrates more specifically to a process for controlling the lamp used in a second profile, of the type "jogging/walking".

In a step 1010, the process starts with the activation of the corresponding profile which, as mentioned above, may be made via an external device to the lamp, such as a computer, a smart phone etc . . . .

Then, in a step 1020 the process continues with the capturing of an image by means of image sensor 210.

Then, in a step 1030, the process continues with the storage of said image within the storage memory.

Then, in a step 1040, the process proceeds with the execution of a recognition algorithm for the detection of external sources, such as cars headlights which can be identified by detecting two light disks within the pixelized image. Once identified, the pixels representing these discs are then subtracted from the specific control area (SCA), which is then updated.

Then, in a step 1050, the process proceeds with the calculation of the average brightness within the SCA area.

Then, in a step 1060, a test is performed by the image processor in order to compare the average brightness value with a predetermined threshold (set by the activation of the determined profile: "jogging/walking").

When the average brightness value exceeds the predetermined threshold, the process proceeds to a step 1070, wherein a first result produced by the image processor to reduce the power of LEDs. Optionally such control can be combined with a control of the geometry of the light beam, for instance a rotation of the light beam.

The process then proceeds to a step 1080 involving a fog detection algorithm, based on a particular contrast analysis as described above, so as to bring a next correction element, positive or negative, to the first result generated in the previous step, and finally produce the control information or control signal to the power unit 100.

The process then returns to step 1020 for the purpose of capturing a new image.

If, during the test step 1060, the average contrast value is less than the predetermined threshold, the process continues with a step 1090, where a second result is generated by the image processor, in order to increase the emitting power of the LEDs. Optionally such control can be combined with a control of the geometry of the light beam.

The process then proceeds, during a step 1100, to a fog detection algorithm, similar to the step 1080 so as to bring a next correction element, and finally produce the control information or the control signal to the power unit 100.

The process then goes back to step 1020 for the purpose of capturing a new image.

Figure 14:
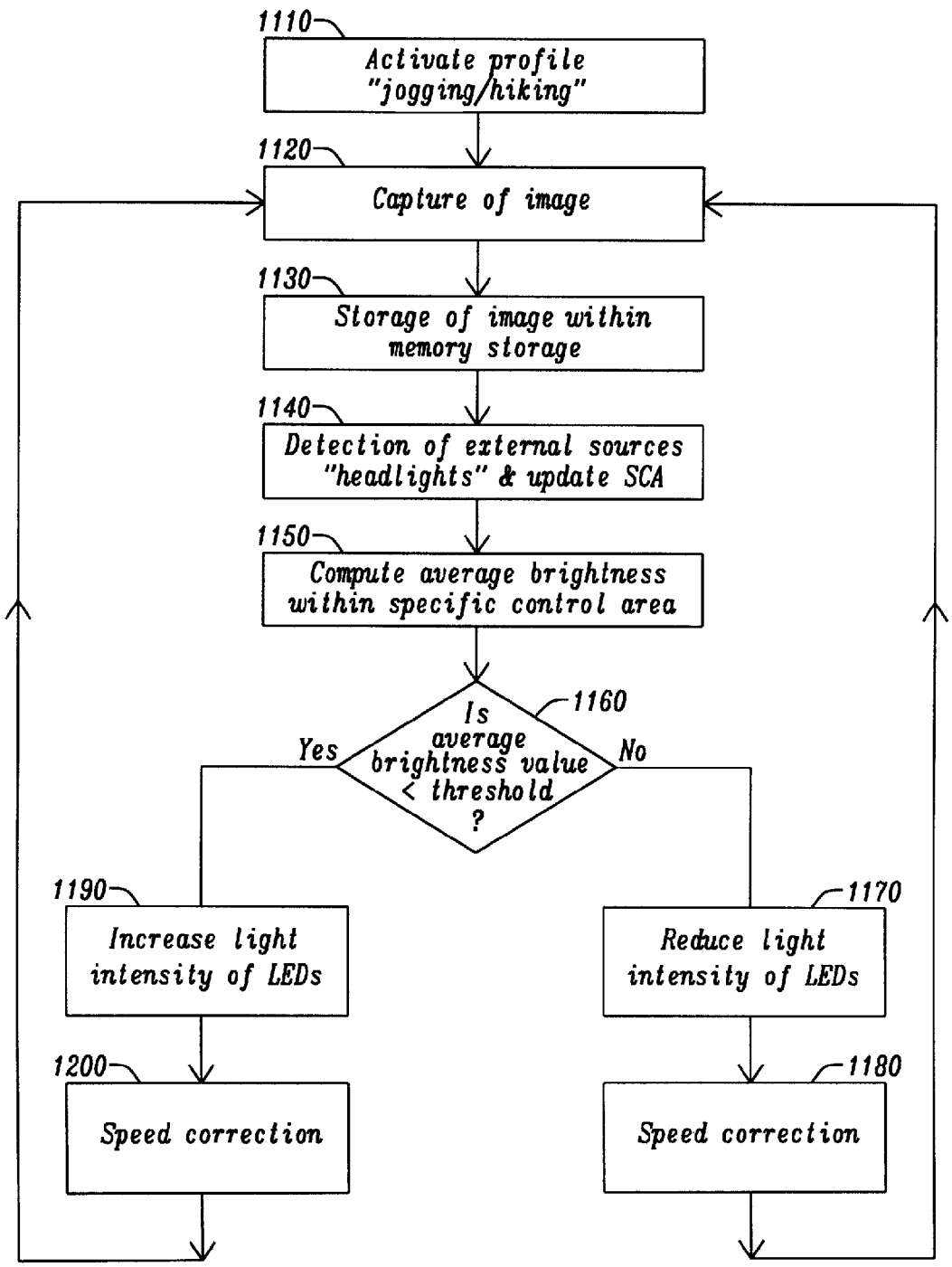
FIG. 14 illustrates an alternative to the embodiment of FIG. 11.

Referring to FIG. 14, one will now describe an alternative to the method of FIG. 10 which incorporates, instead of detecting fog/mist, a speed detection to correct the feedback control process.

Indeed, the inventors have discovered that it is possible to significant improve the regulation process of the lamp by using an increase in brightness when the lamp holder is in a situation of rapid move. On the contrary, in a situation of static activity, the process may somewhat reduce power consumption to extend battery life.

Steps 1110 to 1160 correspond exactly to steps 1010-1060 and will therefore, for the sake of conciseness, not be further developed.

When, during the test of step 1160, the average brightness value exceeds the predetermined threshold, the process then proceeds to a step 1170, wherein a first result is computed by the image processor for the purpose of reduce the power of LEDs.

The process then continues, in a step 1180, with a by a speed sensing algorithm which may be based on the use of sensor 290 or still derived from the image processing. In the step 1180, when sensor 290 or the algorithm executed by the image processor determines a significant move of the lamp, the first result generated by the image processor 230 is corrected by an additional information so as to introduce a relative increase of the brightness.

The method then returns to step 1020 for the purpose of capturing a new image.

If, during the test of step 1160, the average contrast value is less than the predetermined threshold, the process continues with a step 1190, where a second result is generated by the image processor, to increase the power of emission of the LEDs. Optionally such control can be combined with a control of the geometry of the light beam.

The process then continues, at a step 1200 by an algorithm for speed detection achieving, as above in step 1180, a correction of the second result generated by the image processor and ultimately produce a control information or a control signal to the power unit 100.

The process then returns to step 1020 for the purpose of capturing a new image.

The embodiments described with reference to FIGS. 3-11 have no other purpose than to provide a demonstration of the many possibilities that are offered by the introduction of image processor 230 within the headlamp (in this example).

Many other embodiments are possible.

In particular, one may combine the use of this lamp with the advantages brought by the known lamp described in European patent application FR2930706, by particularly arranging a supplementary sensor, distinct from the image sensor 210, which aims to detect part of the light being reflecited by the subject exposed to the light beam. One can thus achieve a particularly fast regulation process of the power emission of the LED lams, while combining such regulation with the control of the geometry of the light beam being derived from the digital processing of the image.

One can also achieve, in combination of the image processing or quite independently form the latter, a more efficient detection of fog, mist or smoke, by means of an infrared LED (IR) having a slightly off-axis (upward) with respect to the main axis of the power LED emitting light in the visible range.

Figure 15A:
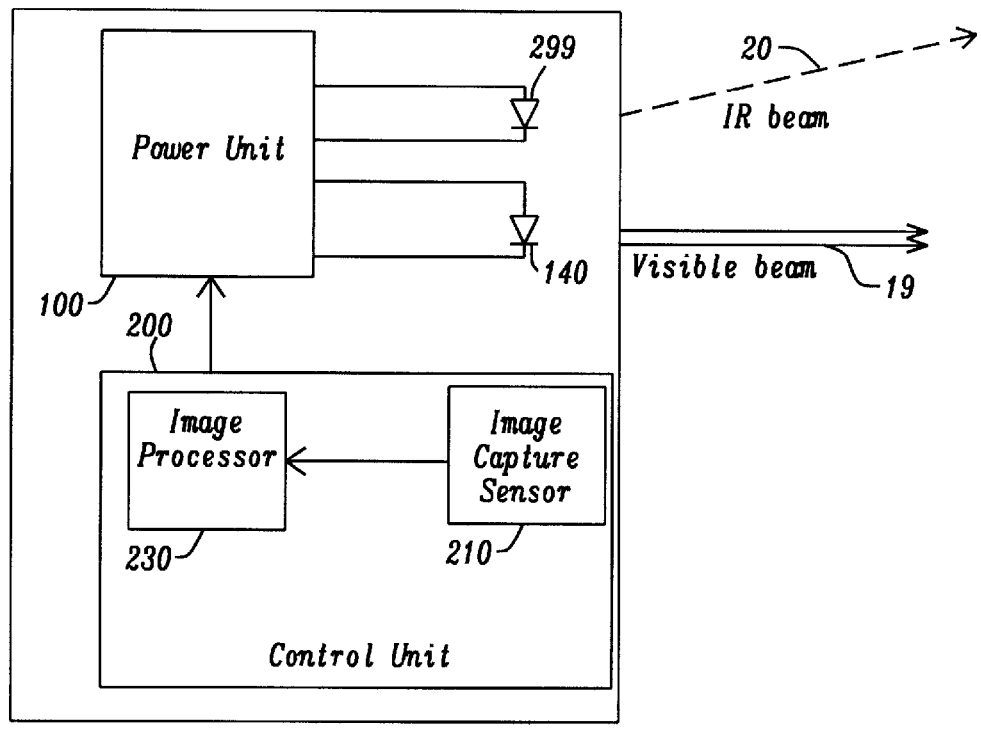
FIGS. 15a and 15b illustrate one specific embodiment achieving the detection of fog and/or smoke particles.

FIG. 15*a* illustrates one embodiment of the lamp having a power unit 100 for supplying power to one or more high power LEDs (only LED 140 being illustrated) and an infrared LED 299 for generating an IR beam 20 along an axis slightly offset with regard to the presumably horizontal axis 19 of LED 140.

Control unit 200 includes, as in the embodiment of FIG. 2, image sensor 210 generating images to the image processor 230, which in this particular embodiment is able to perceive information in the infrared spectrum.

It will now be described how to use the embodiment of FIG. 15*a*, in relation to the timing diagrams in FIG. 15*b*.

Figure 15B:
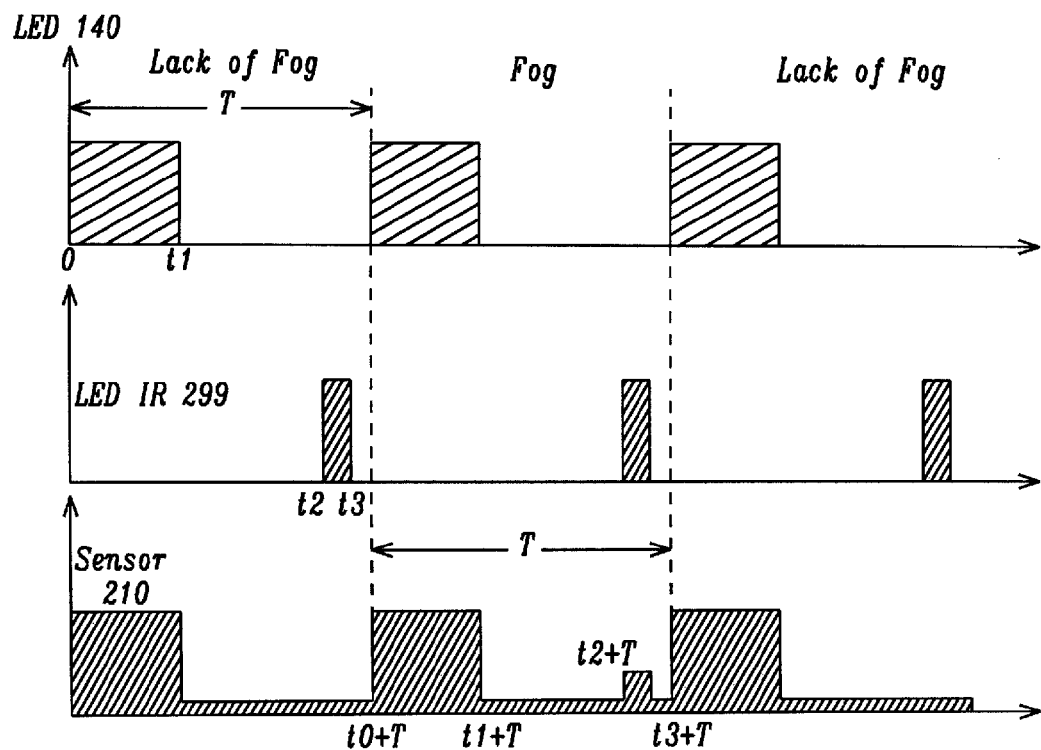

FIG. 15*b* shows, from top to bottom, the transmission signal of the LED140, the emission of infrared LED 299 and a representation of the light received by the image sensor 210. The period T of the PWM signal is shown in the figures which show the frequency of the PWM pulse train of the light generated by LED 140, particularly between the instants $[t_0, t_1]$, $[t_0+2T, t_1+2T]$ etc . . . . It is also observed that the power unit (controlled by the control unit 100) also generates a current supply of IR diode 299 between instants $[t_2, t_3]$, $[t_2+T, t_3+T]$, $[t_2+2T, t_3+2T]$ occurring at a time when no visible light is transmitted through the power diode 140, combined or not to a variable focal optics system.

More specifically, the method comprises the steps of:
generation of visible light through or power LED lamps in a PWM mode;
generating an IR beam when no visible light is generated;
capturing the reflected signal during the emission of the IR beam;

comparing said reflected signal with a predetermined threshold, and when the reflected signal is above the threshold, determining fog, mist or smoke particles.

The timing diagram shows that the signal which is sensed by image sensor 210, which signal shows a peak [$t_2+T$, $t_3+T$] when the fog or smoke causes a partial reflection of the IR light generated by the sensor. In this way, the image processor can discriminate a situation with the presence of fog or particles (mist, smoke) and a situation without such fog or particles, so as to advantageously control the geometry of the light beam, for instance by lowering the light beam, like the fog lamps existing in some motor vehicles.

Figure 13:
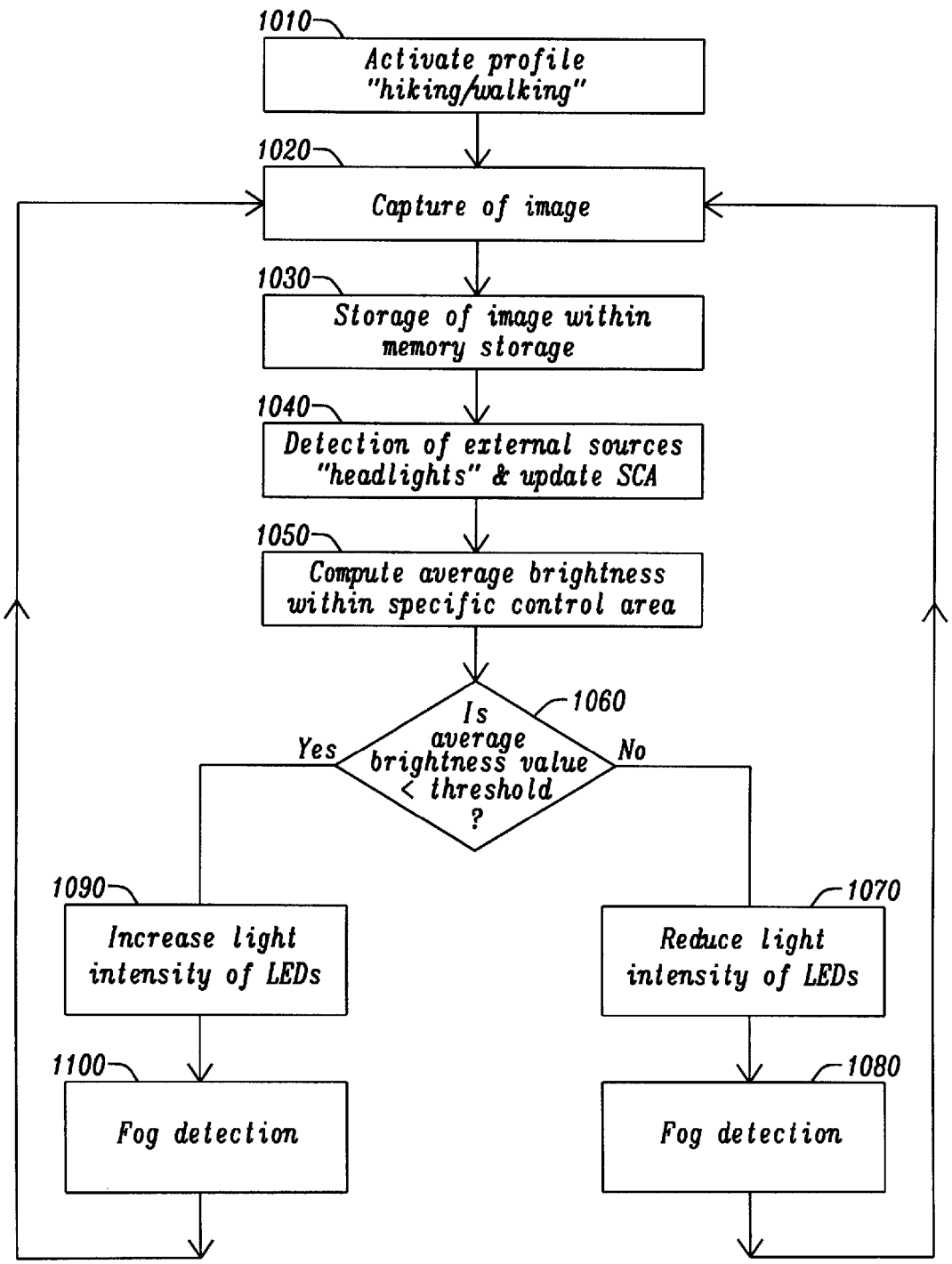

The use of such a process can advantageously be made during steps 1080 and 1100 of the process respectively described in reference to FIG. 13.

It should be noted that the diagram of FIG. 12*b* is a first particular embodiment. In a second embodiment, one may also consider the generation, simultaneously, of an IR beam with a beam of visible light, so that the image sensor indiscriminately perceive the image visible and infrared peak reflected by the steam and/or water vapor. In this second embodiment, one will arrange, within the image processing algorithm, filtering means for detecting the return of the infrared peak and thus achieve the detection of the presence of fog, smoke or fog

The invention claimed is:

1. A headlamp comprising:
   a light source comprising one or more LED type diodes;
   control means for controlling the geometry of the light beam of said light source in response to a control information or a control signal;
   a control unit for generating said control information or said control signal;
   wherein said headlamp is configured to be carried on a user's head and allowing hand-free lighting for such user;
   wherein said control unit comprises a image sensor included into said headlamp wherein said image sensor is configured for capturing an image of the scene being illuminated by said headlamp and said image sensor being further aligned with the axis of said LEDs, said image sensor generating at least one image arranged in pixels of the area illuminated by said light source and processing means for processing said image so as to generate said control information or said control signal.

2. The headlamp according to claim 1 wherein said light source comprise a display unit including at least two LED diodes, each having its focal optical system, and which powering is controlled by said control information or said control signal.

3. The headlamp according to claim 1 wherein said light source comprises one or more LED diodes associated to a controllable optical system, said optical system being controlled by said control information or said control signal.

4. The headlamp according to claim 1 wherein said light source comprises at least a first LED and a second LED, with slightly different axis and which the respective power currents are function of said control information or said control signal.

5. The headlamp according to anyone of claim 1, wherein said control module further comprises means for determining the speed, said image processor using both the image processing and said speed determination means for controlling the geometry of the light beam.

6. The headlamp according to claim 1 wherein said processing means determine a specific control area (SCA) within said image, being subject of the image processing so as to generate said control information or said control signal.

7. The headlamp according to claim 1 wherein said processing means comprises an image processor performing a computation of the average brightness of the pixels that are representative of said image for purposes of comparison with a threshold in order to generate said control information or said control signal.

8. The headlamp according to claim 7 further comprising a second sensor generating one second information representative of the reflected light intensity of the illuminated area, the control of the geometry of said light beam being derived from both said digital processing of the pixels and from said second reflection information.

9. The headlamp according to claim 1 wherein said image processor performs a contrast analysis on said image in order to detect fog, mist and/or smoke particles so as to generate said control information or said control signal.

10. The headlamp according to claim 1 wherein the processing means comprises means for configuration of the lamp, in particular according to one or more predetermined profiles.

11. The headlamp according to claim 10 wherein said configuration is carried out by means of a USB port for communicating with a computer, a touch pad, or a smart phone.

12. The headlamp according to claim 1 comprising:
   a light source having one or more LED-type diodes;
   means for controlling the geometry of the light beam of said light source in response to a control information or a control signal;
   a control unit for generating said control information or said control signal, further comprising:
   at least one infrared lamp having an axis offset from the axis of said light source;
   control means of said infrared light to generate an infrared beam;
   means for detecting a reflected infrared light, said control unit deriving from said detection an information representative of the presence of fog, mist and/or smoke particles to be forwarded to said control unit.

13. The headlamp according to anyone of claim 1 wherein the capturing and the processing of the images is achieved by means of a single integrated circuit.

14. A method for adjusting the light generated by a headlamp comprising one or more LEDs, comprising the steps of:
   providing a headlamp comprising:
      a light source comprising one or more LED type diodes;
      control means for controlling the geometry of the light beam of said light source in response to a control information or a control signal;
      a control unit for generating said control information or said control signal;
   wherein said headlamp is configured to be carried on a user's head and allowing hand-free lighting for such user;
   wherein said control unit comprises an image sensor included into said headlamp wherein said image sensor is configured for capturing an image of the scene being illuminated by said headlamp and said image sensor being further aligned with the axis of said LEDs, processing means for processing said image so as to generate said control information or said control signal, a controllable power unit for supplying power to the LED lamps and a control unit for controlling the light generated by the lamp
generating an image arranged in pixels of the area illuminated by said light source by means of said image sensor included into said headlamp;
storing said image in a storage memory; and
processing of said image to generate said control information or said control signal to said controllable power unit.

15. The method according to claim 14 further comprising the steps of:
using two LED diodes with slightly different axis and which the respective power currents are function of said control information or said control signal;
determining the speed, wherein said image processor uses speed determination means for controlling the geometry of the light beam;
determining a specific control area (SCA) within said image, being subject of the image processing so as to generate said control information or a control signal;
computing of the average brightness of the pixels that are representative of said image for purposes of comparison with a threshold in order to generate said control information or said control signal;
performing contrast analysis on said image in order to detect fog, mist and/or smoke particles so as to generate said control information or said control signal;
using processing means to configure the lamp according to one or more predetermined profiles;
communicating profiles with a computer, touch pad or smart phone using a USB port.

* * * * *